March 11, 1952     F. R. BEESON     2,588,472

ASTRONOMICAL TEACHING AND TRAINING APPARATUS

Filed March 7, 1951     2 SHEETS—SHEET 1

Inventor
Frank R. Beeson
By Clarence A. O'Brien
and Harvey B. Jacobson
Attorneys March 11, 1952  F. R. BEESON  2,588,472

ASTRONOMICAL TEACHING AND TRAINING APPARATUS

Filed March 7, 1951  2 SHEETS—SHEET 2

Inventor

Frank R. Beeson

By *Clarence A. O'Brien and Harvey B. Jacobson*
Attorneys

Patented Mar. 11, 1952

2,588,472

UNITED STATES PATENT OFFICE 2,588,472

ASTRONOMICAL TEACHING AND TRAINING APPARATUS

Frank R. Beeson, Eugene, Oreg.

Application March 7, 1951, Serial No. 214,341

11 Claims. (Cl. 35—47)

This invention relates to astronomical apparatus providing a representation of the celestial sphere for educational or training purposes and it has for its main object to provide an apparatus which is relatively inexpensive, which is adaptable for different educational and training purposes, and which nevertheless reproduces the celestial sphere with a very high accuracy so that students trained by means of this sphere have no difficulty in applying the orientational skill acquired by using the apparatus to the finding and measuring of stars or constellations found on the actual celestial sphere.

Apparatus of this type for large audiences, usually called "planetariums" are known which consists of a complex projection apparatus, projecting the image of the stars on a dome-shaped vault.

Apparatus of this type are however extremely expensive and are only operable in large buildings specially adapted for this purpose. Smaller apparatus, still of relatively large size, have also been proposed which are in the shape of a portion of a sphere or of a half sphere of such size that a single individual may enter or may stand below with his eyes being approximately in the center of the sphere. These apparatus or appliances are mostly used for navigational training and are usually located within a darkened room carrying big and small lamp bulbs or lights to indicate and to impress upon the memory of the students the stars and constellations which are used for navigation. However, they cannot provide a more or less accurate reproduction of the celestial sphere as the number of lamps which may be used is limited.

It is an object of the invention to provide a picture of the celestial sphere which is as accurate as possible, using however means which are relatively inexpensive.

It is a further object of the invention to provide means adaptable to the status of educational training of the student which may be either so constructed that the student may see as much of the celestial sphere as he sees when looking up towards the sky or may be so constructed that the picture seen is confined to any selected smaller sector to be studied.

A further object of the invention consists in providing means on the apparatus for taking position measurements of any given star or constellation.

A further object of the invention consists in providing a completely closed hollow sphere illuminated from the outside and provided with holes of such size and located in such places that a complete chart of the celestial sphere appears on the inside of the hollow sphere, the picture on the inside of the sphere being transmitted to an observer standing outside of the sphere.

A further object of the invention consists in making the segment or portion of the celestial sphere which is viewed adjustable by means of an adjustable mirror into which the observer looks and the position of which may be changed and adjusted by means manipulated by the observer.

A further object of the invention consists in making the sphere rotatable around an axis, the sphere being suspended by means of a pivot arranged in the axis of the celestial sphere and being held by arms and other means encircling the sphere and arranged on the outside.

A further object of the invention consists in providing means for adjusting the position of the celestial axis around which which the sphere may turn relatively to the observer and relatively to the ground on which the sphere is supported.

A further object of the invention consists in providing a mirror supporting and instrument supporting segment which forms part of the sphere and closes the same and which carries all means for adjusting the position of the mirror and of the viewing instrument and scales for reading the adjustments which are necessary for determining the location of a definite star with respect to a zero position.

A further object of the invention consists in providing a floating segment for closing the sphere and for carrying the viewing instrument and the mirror, the lateral position of which with respect to the axis of rotation of the sphere is adjustable.

Further and more specific objects will be apparent from the following detailed specification.

The invention is illustrated in the accompanying drawing showing one modification thereof by way of example. It is however to be understood that the example shown was selected in order to explain the principle of the invention and the best mode of applying said principle. As an application of the principle of the invention in different ways is possible, it will be clear that a departure from the construction illustrated in the drawings is not necessarily a departure from the principle of the invention.

Figure 1:
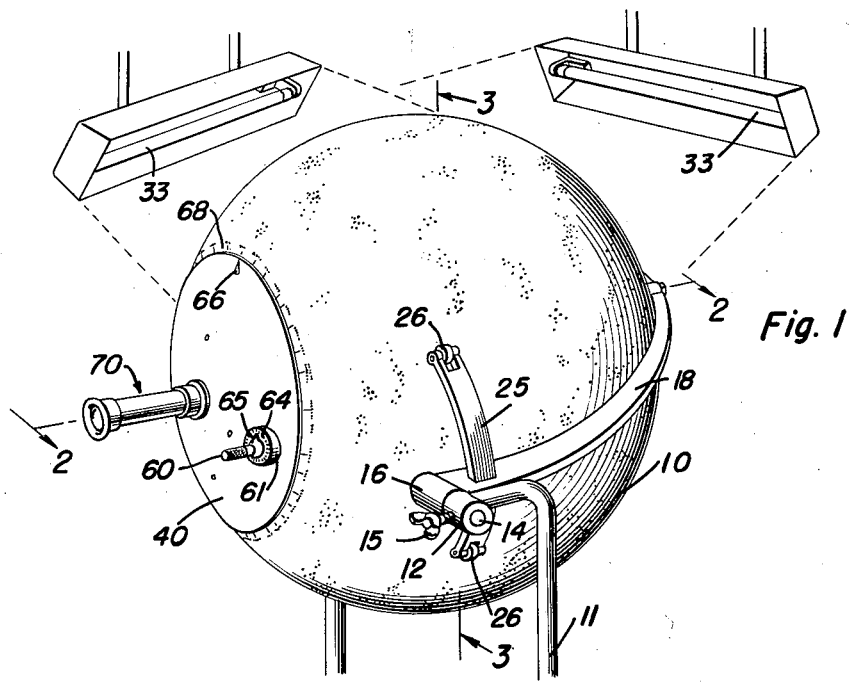
Figure 1 is a perspective view of the entire arrangement, showing the sphere from the outside and also showing diagrammatically the means for illuminating the outside of the sphere.
Figure 2:
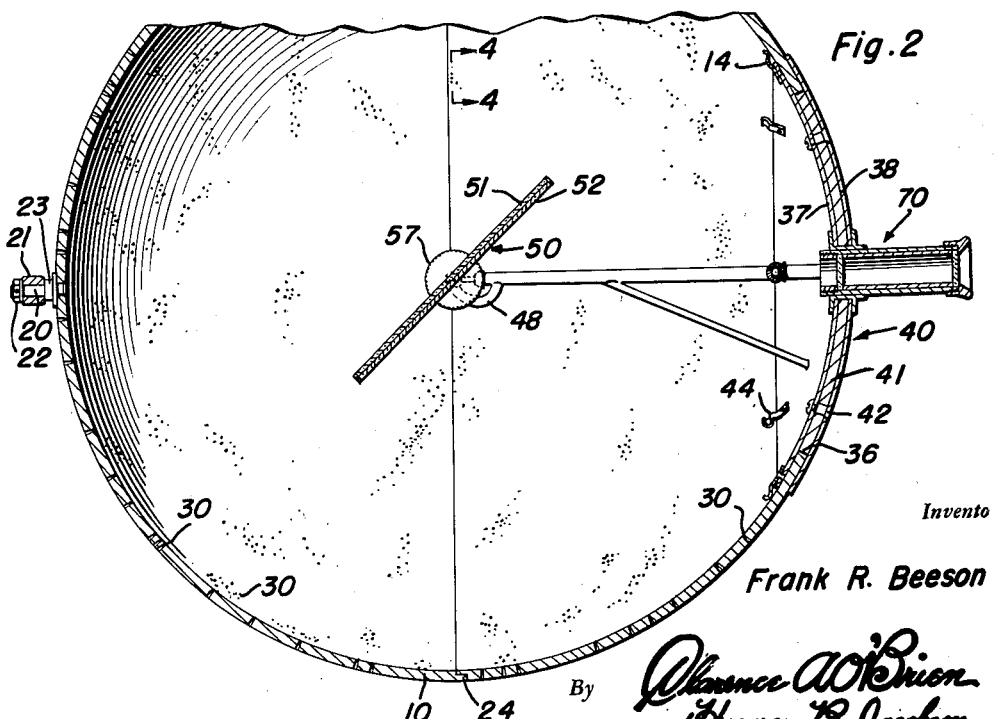
Figure 2 is an elevational sectional view through a horizontal plane indicated at 2—2 in Figure 1.
Figure 3:
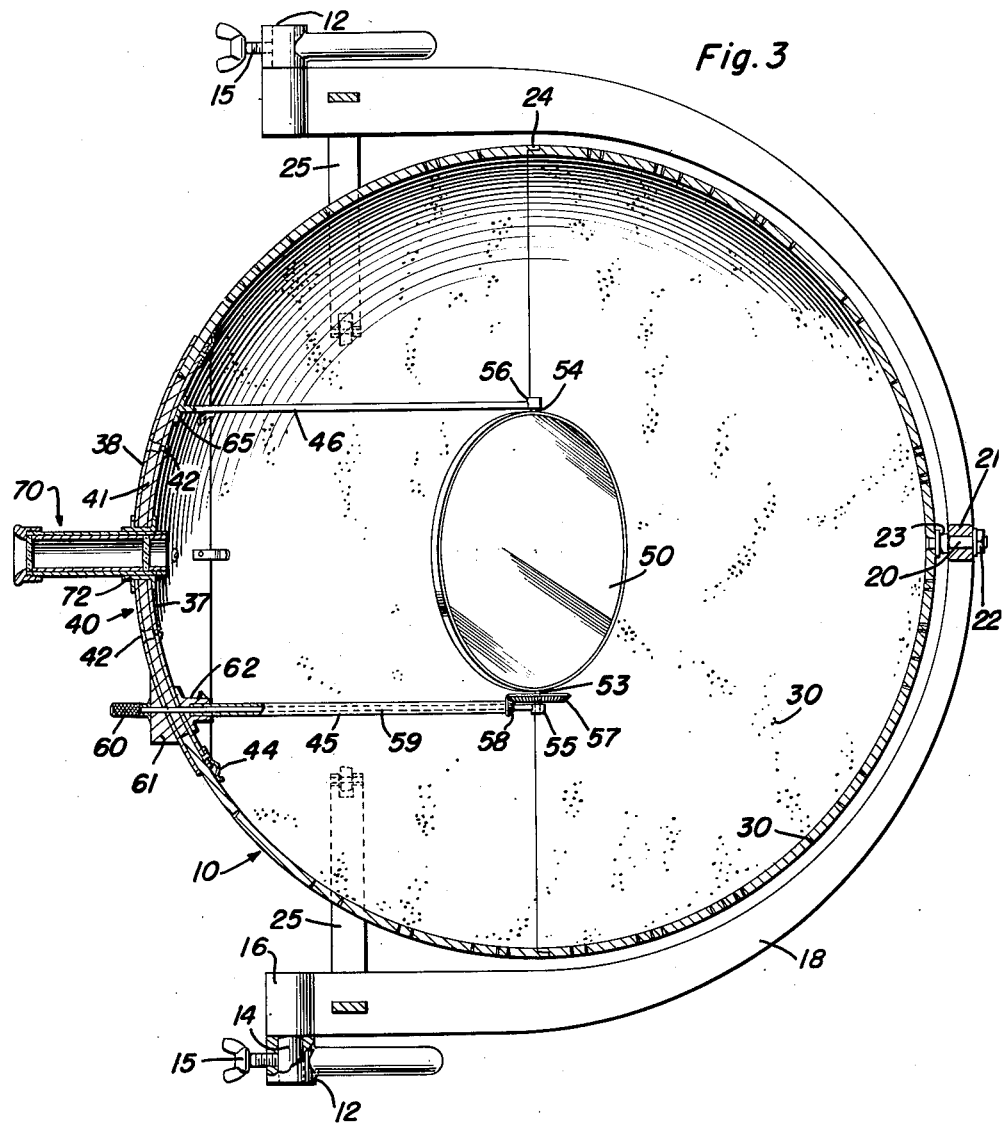
Figure 3 is an elevational sectional view of the sphere, the section being taken along the plane indicated at 3—3 in Figure 1.

As has been already explained the apparatus according to the invention consists of a hollow, completely closed sphere, provided with a celestial chart on the interior surface, this chart being formed by providing a hole piercing the sphere at the place of every star represented in the chart or map, said holes being of different size. The sphere is illuminated on the outside and is viewed from the inside. When viewed from the inside the holes through which the light penetrates simulate the picture of stars. The size of each hole is so chosen that the light falling through it corresponds to the order of magnitude to which the star belongs. To view the sphere from the inside while the observer is placed on the outside, a mirror is arranged in the center of the sphere with the reflecting surface arranged in a plane bi-secting the sphere and passing through its center. The position of the mirror is adjustable around the center and the mirror may be moved around a pivot to any position through an arc of 360°. An optical viewing instrument or telescope is arranged on the sphere in front of the mirror with its objective lens on the inside and its ocular outside the sphere so that the observer, while standing or seated outside, gets a view which corresponds to a position in the center of the hollow sphere.

The sphere is rotatably mounted, the axis of rotation being so arranged that it corresponds to the axis of rotation of the celestial sphere and in addition, the position of this axis in space is adjustable in order to permit the observer to adopt a position which is most convenient for him or in order to reproduce the position of the celestial axis in a given location.

The viewing instrument or telescope together with the mirror supporting and adjusting members are carried by a movable segment which completely closes the sphere and which may either be arranged to rotate or which may be arranged to float, permitting a limited lateral shifting movement in every direction along the surface of the sphere.

In the specific example shown in the accompanying drawings the hollow sphere 10 consists of any suitable opaque material and for the purpose of assembly it may be divided into two sections which are glued, cemented or otherwise fixed to each other as shown at 24. The sphere, when assembled, is supported on suitable supporting members or standards in the form of vertical or substantially vertical tubes or rods 11 which are preferably bent at their ends. These ends carry sleeves 12 forming a bearing for a trunnion 14 the position of which within the sleeve may be fixed by means of a set screw 15. The trunnion or pin 14 is preferably integral with or fixedly held by a cylindrical boss 16 which forms the end of an arcuate supporting member 18 encircling the sphere partly, which member carries the bearing 21 of the pivot 20 around which the sphere may rotate. The axis of the pivot is coincident with the axis of the celestial sphere which is represented in the interior of the hollow sphere 10.

The arcuate member 18 is parallel to one of the great circles of the sphere 10 passing through the axis of the pivot 20 and extends over an arc which exceeds 180°. The pivot bearing 21 receives pivot 20 which is fixedly mounted on and projects from the outside of the sphere and which may be held within the bearing 21 by a nut 22 which together with a suitable collar 23 prevents any unwanted play.

The arcuate supporting member 18 is rotatable around the axis of trunnion 14 held in sleeve 12 of the supporting rods or standards 11 and near the cylindrical bosses 16 somewhat resilient, curved, transverse sphere guiding and supporting members 25 are projecting from the said members 18 which are curved towards the sphere. Both ends of each member 25 are forked and rollers 26 are carried between the prongs of the forks which rollers run on the outer surface of the sphere 10. As each end of the member 18 is provided with such a transverse guiding member and as the rollers of the said members run on a parallel of the sphere which is smaller than the equator, the rollers 26 and the pivot 20 being on different sides of the equator, the aforementioned members form together a complete supporting system, permitting rotation of the sphere around the pivot 20, but otherwise holding the sphere positively and firmly, while permitting to dispense with a second pivot. It will also be clear that the direction of the axis around which the sphere may turn is adjustable around the axis of the trunnions 14. The bent ends of the standards or supporting rods 11 are provided for the purpose of supporting the sphere essentially in a plane passing through the center of the sphere while providing an axis for adjustment of the position of the sphere which is eccentric and close to the observer.

Figure 4:
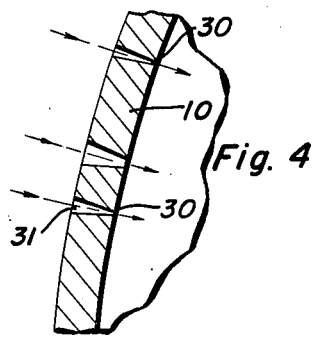
Figure 4 is a sectional view of a detail.

In the interior of the sphere 10 a complete chart of the stars is laid out including all the stars down to any selected magnitude and on every point corresponding to the location of a star the sphere is pierced by a hole 30 which is preferably of conical shape as seen at 31, Figure 4, the diameter of the openings corresponding to the order of magnitude of the star.

The number of stars represented by holes 30 will of course vary with the size of the sphere and with the special purpose for which the apparatus was constructed. However, even with spheres of relatively small dimensions a celestial sphere with a large number of stars approximating the number of stars visible with the naked eye can be shown.

In order to make the stars luminous to the desired extent a number of light sources 33, represented in the drawing as fluorescent lights, is arranged on the outside of the sphere, the said light sources being preferably provided with means for distributing the light evenly over the outer surface of the sphere.

On the side of the sphere 10 which is directly opposite to the side supported by the pivot 20 and practically centered on the axis of the sphere passing through the said pivot an opening 36 is provided in the sphere 10 which is closed by covering segment 40. The segment consists of a body portion or core 41 made of the same material of which the sphere itself is made, approximately filling the opening 36 of the sphere and covered by an outer and inner segment plate 37 and 38 respectively. The outer segment plate 38 may be cemented or glued to the body or core 41 so as to form practically one piece with the said body while the inner segment plate 37 is preferably detachable for purposes of assembly and may be held by screws threaded into bolts as indicated at 42. Preferably both plates 37 and 38 overlap the adjacent portions of the sphere 10 and they serve as guides holding the marginal portion of the sphere near the opening 36 between them. The inner segment plate 37 may moreover be provided with spring clamps 44 sliding on the inner surface of the sphere so as to provide sufficient resilient pressure and friction to prevent accidental displacement.

On the said closing segment 40 supports 45 and 46 of the mirror 50 are mounted. The mirror 50 consists of a thin silvered piece of glass or plastic 52 held on a suitable backing 51 with the reflecting surface arranged in a plane bisecting the sphere and therefore passing through the center of the same. The backing 51 is provided with trunnions 53, 54 which are held in eyes 55, 56 of the supports 45 and 46 respectively. The support 45 is preferably a hollow tube and its straight portion is shorter than the support 46. However it is provided with a curved arm 48 projecting from its end which holds the eye 55. The support 45 may be held on the inner segment plate 37 by means of a shoe 62, while support 46 may be mounted on said plate 37 by means of a suitable foot plate 65 provided at its end.

On the trunnion 53 of the mirror 50 a bevel gear wheel 57 is mounted which meshes with a small bevel gear wheel 58 mounted on a spindle 59 which is threaded through the hollow interior of the support 45. This spindle projects to the outside passing through a bore of the segment 40 and is provided with a knob 60. A suitable boss 61 may be provided on the outer curved segment plate 38, the plane surface of which carries a graduation 64, while the knob 60 carries preferably a small pointer 65 adapted to cooperate with the graduation 64 and permitting to adjust exactly the angular movement of spindle 59. Obviously a turning of the knob will rotate the gear wheels and thereby turns the mirror which directs its face towards different segments of the hollow sphere.

In the center of the segment 40 a viewing apparatus preferably a telescope 70 is mounted in a light tight manner by means of a sleeve 72 holding the viewing instrument which permits an adjustment of the same. The telescope need not be described. It is selected in accordance with the specific purpose which the sphere has to serve. If, for instance, used for navigational training purposes a small segment of the sphere should only be visible and the telescope is selected accordingly, while for the purpose of instruction of students who are not acquainted with astronomy a segment of considerable angular width should be shown and the telescope must be fitted to this purpose.

For the last named purpose it is also advisable to use a floating segment 40, constructed as shown, but with a body portion 41 of a diameter which is much smaller than the opening 36. The segment is then held mainly by virtue of the plates 37 and 38 gripping the body of the sphere around the opening 36, but may be shifted laterally within the opening. The viewing instrument or telescope in such a case is preferably placed eccentrically so that the view in certain positions correspond as nearly as possible to the view which the student actually has when looking at the sky at the place at which he is living.

When the telescope is arranged in the center and when the segment is merely rotatable but not shiftable as shown in the drawings, the segment may be provided with a pointer 66 on its marginal portion and on that portion of the sphere which surrounds the opening 36 a further graduation 68 may be provided.

The graduation 64 indicates the extent to which the mirror is moved and, as will be clear, thus indicates the declination of the star viewed in the center of the viewing instrument which may be provided with the usual cross. The rotation of the segment around the axis of the sphere which is coincident with the optical axis of the instrument provides the right ascension indication for the same star located in the optical axis of the telescope.

The operation of the apparatus will be clear from preceding description and need therefore not be described in detail.

From the above it will be seen that the invention provides means which are adaptable for different purposes such as general educational instructions or navigational training, reproducing either a large or a small portion of the sky and permitting by means of the viewing instrument or telescope to execute exact measurements paralleling those carried out with navigational instruments. On the other hand the instrument may, if suitably constructed, provide the student with a view of a large portion of the celestial sphere or even with a portion approximately equal to a hemisphere which may be used for explaining the main constellations and stars and for impressing their location on the memory of the student.

It will be clear that the construction illustrated in the drawing may undergo certain changes and that unessential elements may be replaced by others without departing in any way from the scope of the invention as defined in the annexed claims.

Having described the invention, what is claimed as new is:

1. An astronomical appliance comprising an opaque hollow sphere, the interior surface of which is covered by a celestial chart, formed by providing holes in the sphere piercing the same and located at the places at which the celestial bodies are placed on the chart, a viewing instrument having one of its ends turned towards the interior of the sphere and one of its ends towards the outside, a mirror with a reflecting surface arranged in the center of the sphere, means for adjusting the position of said mirror within the sphere operable from the outside and means for illuminating the outside of the sphere.

2. An astronomical appliance comprising an opaque hollow sphere, the interior surface of which is covered by a celestial chart, formed by providing conical holes piercing the sphere the inner orifice of which is located at the places of the chart indicating the celestial bodies, the diameters of the conical holes on the inside and outside of the sphere being selected in correspondence with the order of magnitude of the celestial bodies represented on the chart, a viewing instrument piercing the sphere and seated in a light tight manner, with one of the ends projecting into the interior of the sphere while the other end projects outwardly, a mirror with a reflecting surface arranged in the center of the sphere, means for adjusting the position of said mirror within the sphere operable from the outside and means for illuminating the outside of the sphere.

3. An astronomical appliance comprising an opaque hollow sphere, the interior surface of which is covered by a celestial chart, formed by providing holes in the sphere piercing the same and located at the places at which the celestial bodies are placed on the chart, said sphere being provided with an opening, a closing spherical segment covering said opening and mounted for rotation therein, an optical instrument mounted radially on said segment and piercing the segment, with its optical axis directed towards the center of the sphere, a mirror with a reflecting surface arranged in the center of the sphere, supporting means for said mirror mounted on the segment, means for adjusting the position of said mirror within the sphere, including a manual adjusting element piercing the segment in a light tight manner, and operable from the outside, and means for illuminating the outside of the sphere.

4. An astronomical appliance comprising an opaque hollow sphere, the interior surface of which is covered by a celestial chart, formed by providing holes in the sphere piercing the same and located at the places at which the celestial bodies are placed on the chart, said sphere being provided with an opening, a closing spherical segment covering said opening and mounted for rotation therein, an optical instrument mounted radially on said segment and piercing the segment, with its optical axis directed towards the center of the sphere, a mirror with a reflecting surface arranged in the center of the sphere, trunnions carried by said mirror, supporting members mounted on the inside of the spherical segment, and provided with eyes, aligned with the center of the sphere for supporting said trunnions, means for adjusting the position of said mirror within the sphere, including a manual adjusting element piercing the segment in a light tight manner and operable from the outside, and means for illuminating the outside of the sphere.

5. An astronomical appliance comprising an opaque hollow sphere, the interior surface of which is covered by a celestial chart, formed by providing holes in the sphere piercing the same and located at the places at which the celestial bodies are placed on the chart, said sphere being provided with an opening, a closing spherical segment covering said opening and mounted for rotation therein, an optical instrument mounted radially on said segment and piercing the segment, with its optical axis directed towards the center of the sphere, said mirror being provided with aligned trunnions the axis of which passes through the center of the sphere, a bevel gear wheel on one of said trunnions, supporting means for said trunnions including a hollow tubular support mounted on said segment, a spindle passing through the hollow tubular support, a bevel gear meshing with the aforesaid bevel gear carried by said spindle, said spindle piercing the segment in a light tight manner, a knob for turning said spindle on the outside, and means for illuminating the outside of the sphere.

6. An astronomical apparatus as claimed in claim 4 wherein the segment consists of a body member, substantially filling the opening of the sphere and of an outer and inner plate both projecting over the margin of the body and sliding on the outside and inside of the sphere respectively, thus sealing the segment in a light tight manner and guiding the same when rotating within the opening of the sphere.

7. An astronomical appliance comprising an opaque hollow sphere, the interior surface of which is covered by a celestial chart, formed by providing holes in the sphere piercing the same and located at the places at which the celestial bodies are placed on the chart, means for rotating the sphere including a pivot projecting from the outside of the sphere and an arcuate support for holding said pivot partly encircling the sphere, members in contact with the outside of the sphere carried by said arcuate supports, a viewing instrument having one of its ends turned towards the interior of the sphere and one of its ends towards the outside, a mirror with a reflecting surface arranged in the center of the sphere, means for adjusting the position of said mirror within the sphere operable from the outside and means for illuminating the outside of the sphere.

8. An astronomical appliance comprising an opaque hollow sphere, the interior surface of which is covered by a celestial chart, formed by providing holes in the sphere piercing the same and located at the places at which the celestial bodies are placed on the chart, means for rotating the sphere, including a pivot projecting from the outside of the sphere and an arcuate support encircling the sphere along an arc exceeding 180°, means for pivotally supporting said arcuate support including standards, transverse members on said arcuate support provided with rollers running on the outside of the sphere, a viewing instrument having one of its ends turned towards the interior of the sphere and one of its ends towards the outside, a mirror with a reflecting surface arranged, in the center of the hollow sphere, supporting means for said mirror mounted on the segment, means for adjusting the position of said mirror within the sphere, including a manual adjusting element piercing the segment in a light tight manner, and operable from the outside, and means for illuminating the outside of the sphere.

9. An astronomical apparatus as claimed in claim 7 wherein the optical axis of the viewing instrument is coincident with the axis of the pivot projecting from the outside of the sphere, said axis being also coincident with the axis of the celestial chart.

10. An astronomical apparatus as claimed in claim 4, wherein the margin of the segment and the margin of the sphere adjacent the segment are provided on the outside with a pointer and a graduation respectively for determining the right ascension of the celestial body viewed along the optical axis of the optical instrument.

11. An astronomical apparatus as claimed in claim 4, wherein the manual adjusting element piercing the segment is provided with a pointer and the segment is provided with a boss carrying a graduation for reading the position of the mirror, corresponding to the declination of the celestial body viewed along the optical axis of the optical instrument.

FRANK R. BEESON.

No references cited.